J. BRICKEN.
MACHINE FOR MAKING BOWS.
APPLICATION FILED SEPT. 11, 1914.

1,224,268.

Patented May 1, 1917.
12 SHEETS—SHEET 1.

Witnesses

Inventor
John Bricken
By Barton & Foell
Attys.

J. BRICKEN.
MACHINE FOR MAKING BOWS.
APPLICATION FILED SEPT. 11, 1914.

1,224,268.

Patented May 1, 1917.
12 SHEETS—SHEET 4.

Fig. 4.

Witnesses
Arthur W. Carlson
Robert H. Weir

Inventor
John Bricken
By Barton & Folk Attys.

J. BRICKEN.
MACHINE FOR MAKING BOWS.
APPLICATION FILED SEPT. 11, 1914.

1,224,268.

Patented May 1, 1917.
12 SHEETS—SHEET 8.

Witnesses:
Arthur W. Carlson
Robert H. Weir

Inventor
John Bricken
by Barton & Folk, Attys.

J. BRICKEN.
MACHINE FOR MAKING BOWS.
APPLICATION FILED SEPT. 11, 1914.

1,224,268.

Patented May 1, 1917.
12 SHEETS—SHEET 10.

J. BRICKEN.
MACHINE FOR MAKING BOWS.
APPLICATION FILED SEPT. 11, 1914.

1,224,268.

Patented May 1, 1917.
12 SHEETS—SHEET 11.

J. BRICKEN.
MACHINE FOR MAKING BOWS.
APPLICATION FILED SEPT. 11, 1914.

1,224,268.

Patented May 1, 1917.
12 SHEETS—SHEET 12.

Witnesses:

Inventor:
John Bricken
By Barton & Foek, Attys.

UNITED STATES PATENT OFFICE.

JOHN BRICKEN, OF CHICAGO, ILLINOIS, ASSIGNOR, BY MESNE ASSIGNMENTS, TO CHICAGO BRAID BOW COMPANY, OF CHICAGO, ILLINOIS, A CORPORATION OF ILLINOIS.

MACHINE FOR MAKING BOWS.

1,224,268.  Specification of Letters Patent.  Patented May 1, 1917.

Application filed September 11, 1914. Serial No. 861,225.

Be it known that I, JOHN BRICKEN, a subject of Russia, residing at Chicago, in the county of Cook and State of Illinois, have invented a certain new and useful Improvement in Machines for Making Bows, of which the following is a full, clear, concise, and exact description.

My invention relates to a machine for tying bow-knots, and more particularly to a machine for forming a continuous ribbon into a plurality of bows.

The object of the invention is to provide a machine of the character described which will do the work which has heretofore been commonly done by hand, and which will produce bows much more rapidly than has heretofore been possible. A further object is to provide a machine which will form bows of uniform size and best possible shape.

My invention consists primarily in a novel combination of groups of elements, practically all of which groups constitute novel sub-combinations of the main invention.

One feature of my invention, therefore, relates to a broad combination of mechanisms for tying a bow-knot.

Another feature relates to the ribbon-guide which moves from side to side of the machine to extend the ribbon.

Another feature relates to the fingers which grasp the extended ribbon at a point distant from the end of the ribbon and over which the ribbon is folded to form one of the loops of the bow.

Another feature relates to the reciprocating jaws which grasp the extended ribbon and fold it back over one of the said fingers in forming the bow loop.

Another feature relates to the mechanism for severing the ribbon into lengths suitable for bows.

Another feature relates to the knot-forming jaws.

Another feature relates to the knot-guide which serves to hold open the temporary loop while the second bow-loop is drawn therethrough and then to properly position the knot formed by tightening the loop.

Another feature relates to the oscillatory jaws which carry the ribbon about the bow-loop first formed and present it to the knot-forming jaws.

The above named and other features of my invention and their coöperation with one another may be more readily understood by reference to the accompanying drawings of a machine embodying the invention, in which—

Like letters of reference refer to like parts throughout the several views of the drawings.

Figure 1:
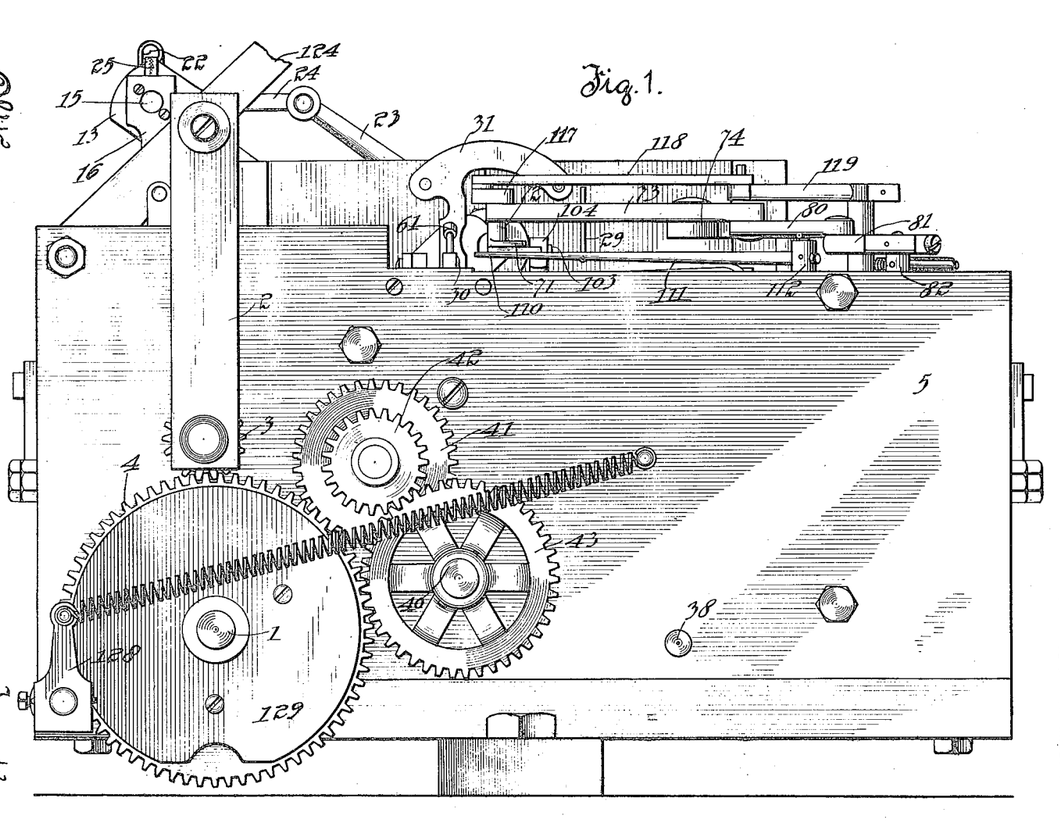
Figure 1 is a front elevation.

The main shaft 1 of the machine can be driven from any suitable source of power. The drawings show a manually operated handle 2 (see Figs. 1 and 3) which, through the medium of a pinion 3, drives a gear wheel 4 secured upon the shaft 1. The shaft 1 is journaled at one end in the front frame plate 5 and passes through an opening in the plate 6, being journaled at the other end in a short plate or bearing block 7.

Figure 2:
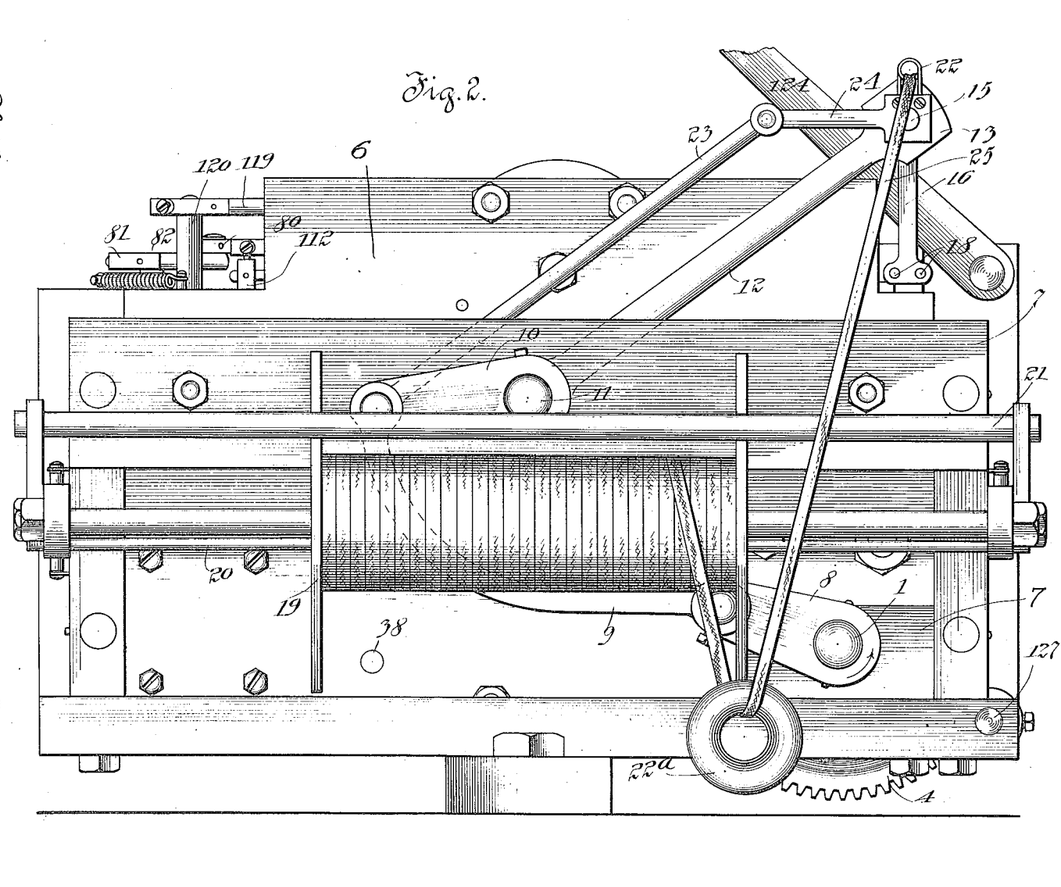
Fig. 2 is a rear elevation.

At its rear the shaft 1 has secured thereto a crank arm 8 (see Fig. 2) which is connected by a curved connecting rod 9 with a crank arm 10 secured upon a crank shaft 11. Said crank shaft also has secured thereto an oscillating arm 12 (see also Figs.

Figure 3:
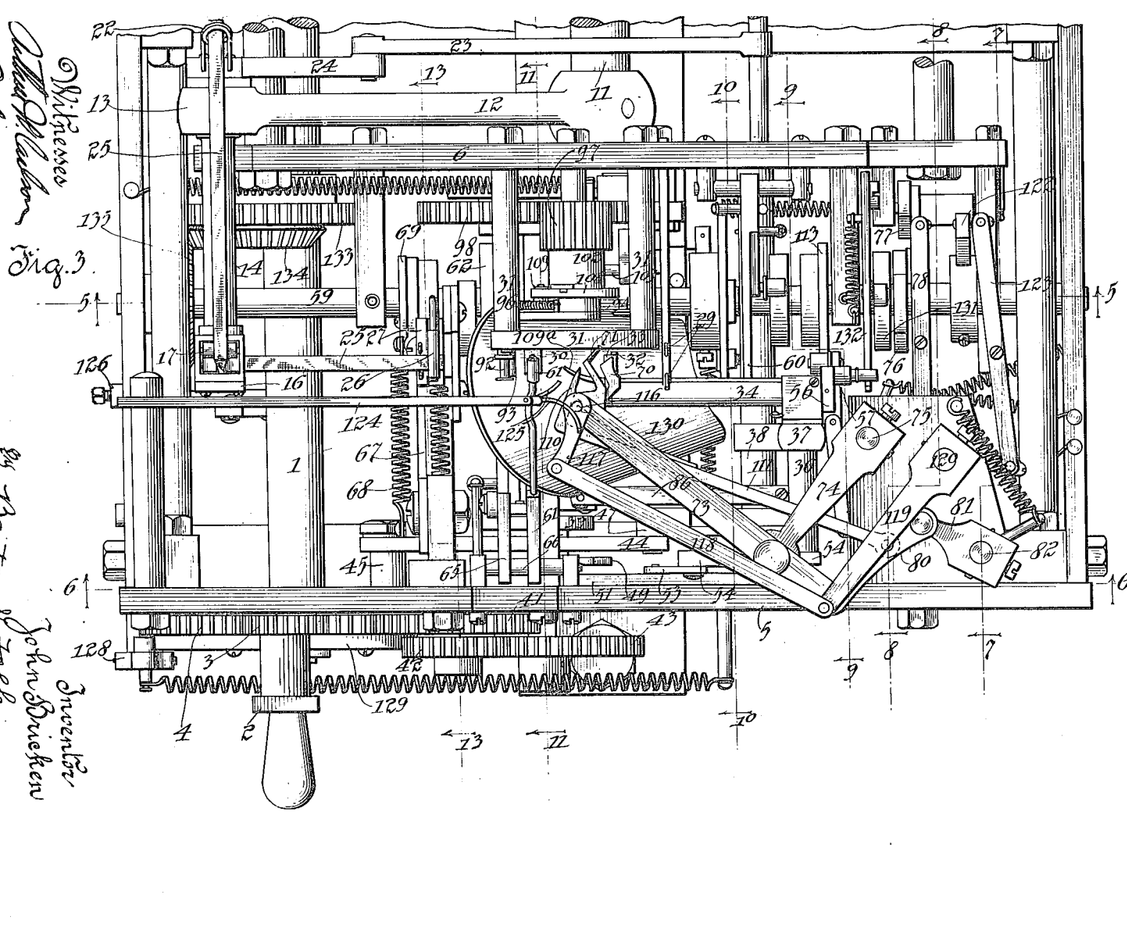
Fig. 3 is a plan view.
Figure 4:
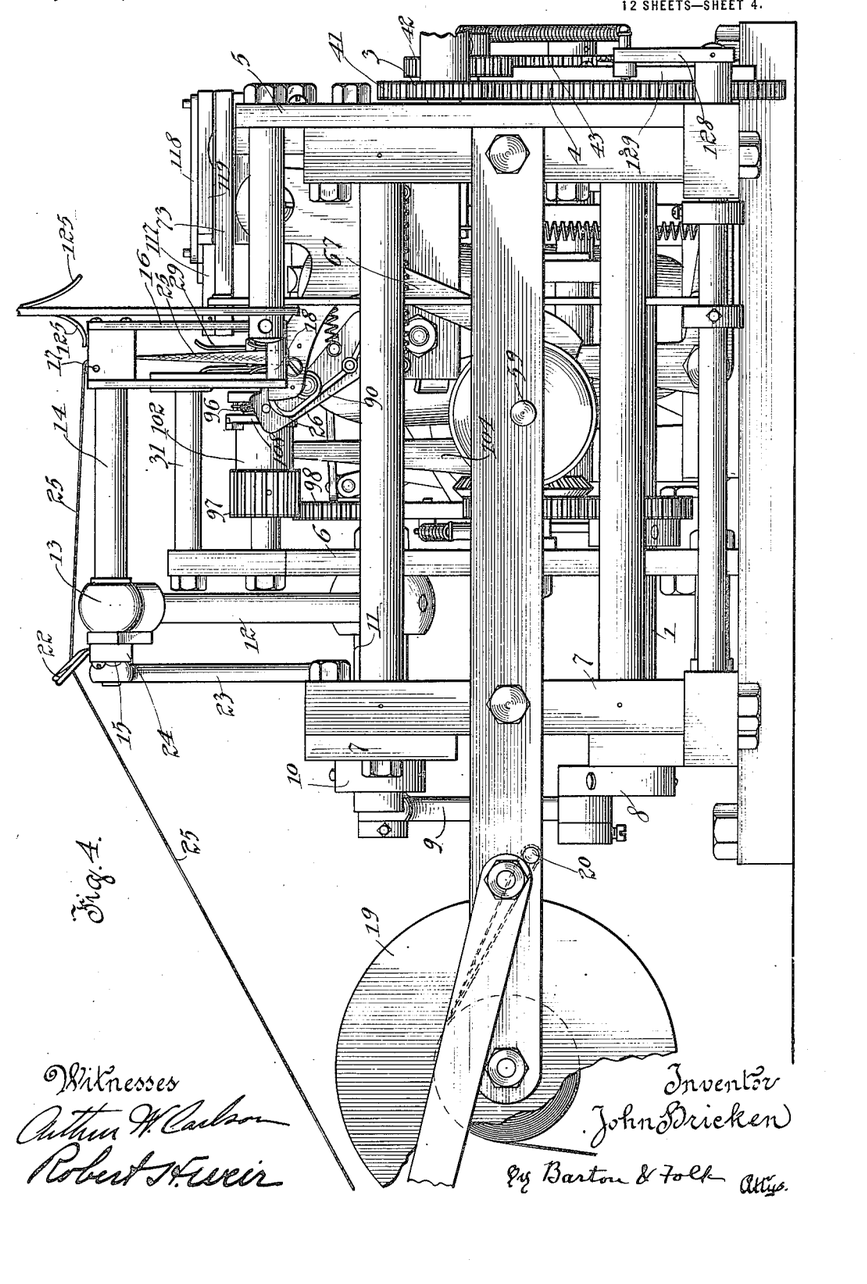
Fig. 4 is a left end elevation.
Figure 5:
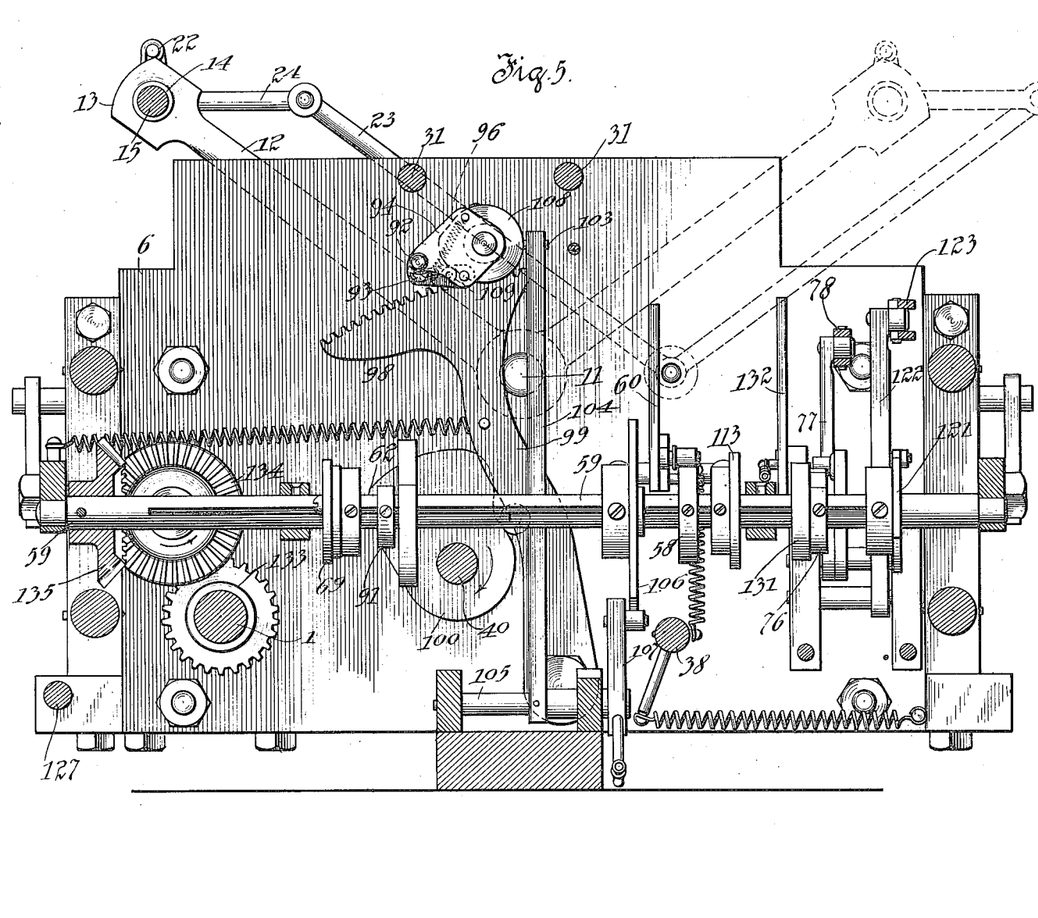
Fig. 5 is a section on the line 5—5 of Fig. 3.

3 and 5), having upon its upper end a head 13 to which is rigidly secured a sleeve 14. Inclosed within the sleeve 14 is a shaft 15, having upon its forward or free end a ribbon-guide 16. Said ribbon-guide may be in the form of a rectangle (see Fig. 4) having a guide roll 17 journaled in its upper end over which the ribbon passes down between a pair of guide rolls 18 journaled in the lower end of the rectangle.

The ribbon, braid or other material 25 from which the bows are formed is led from a rotatably mounted spool 19 (see Fig. 2) about a longitudinally extending rod 20 at the front of the spool and from thence above the spool and about another rod 21 located at the rear of the spool parallel to the rod 20. From thence the ribbon is led through a loop 22 to the ribbon-guide 16. A weight in the form of a ring 22ᵃ through which the ribbon is threaded is employed to provide the proper tension upon the ribbon.

It will thus be seen that as the main shaft 1 is driven, in the present case in a clockwise direction by the contra-clockwise rotation of the handle 2, the oscillating arm 12 is reciprocated from left to right (see Fig. 5) to feed the ribbon in the manner to be presently described.

For the purpose of maintaining the ribbon-guide 16 in a vertical position, a system of parallel links may be employed, said system comprising a link 23 (see Fig. 2) pivoted in the frame of the machine and connected at its upper end with a link 24 pivoted at one end of the link 23 and rigidly secured at its other end to the shaft 15. Such system of parallel links maintains the ribbon-guide 16 in its vertical position.

Figure 6:
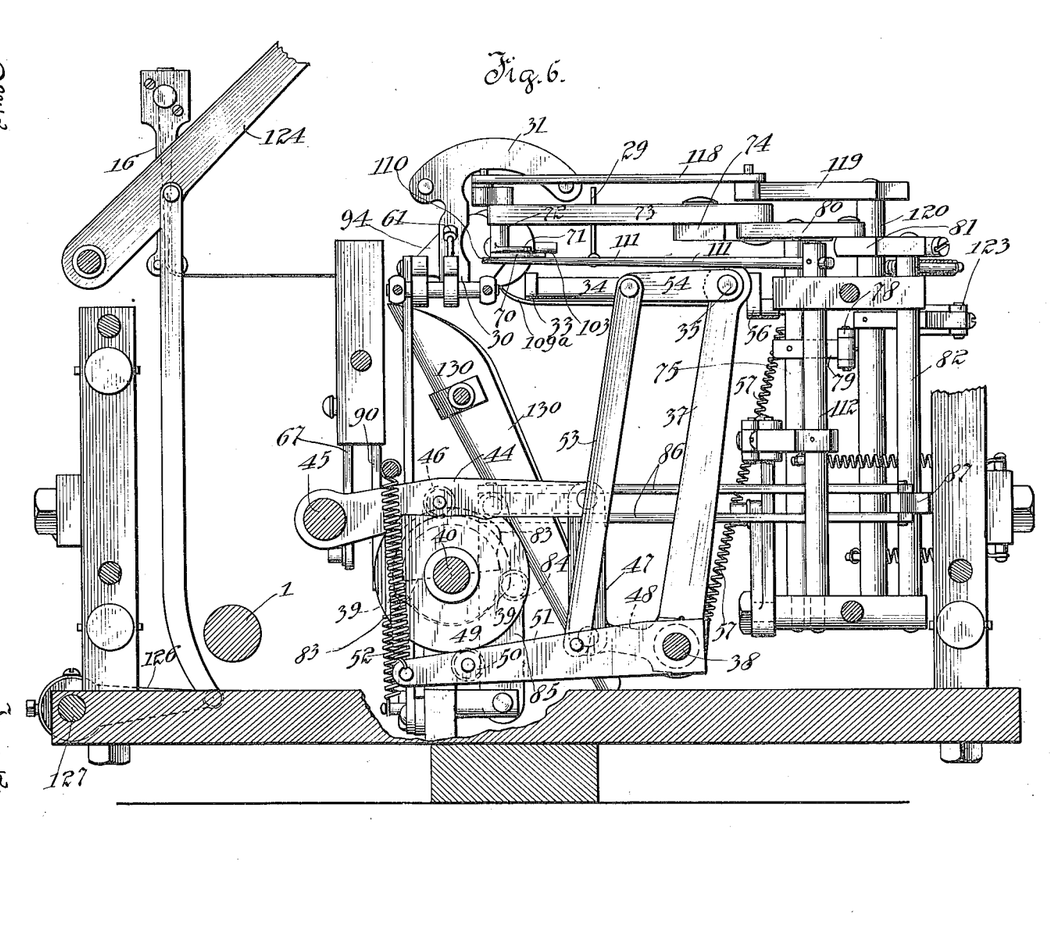
Fig. 6 is a section on the line 6—6 of Fig. 3.
Figure 7:
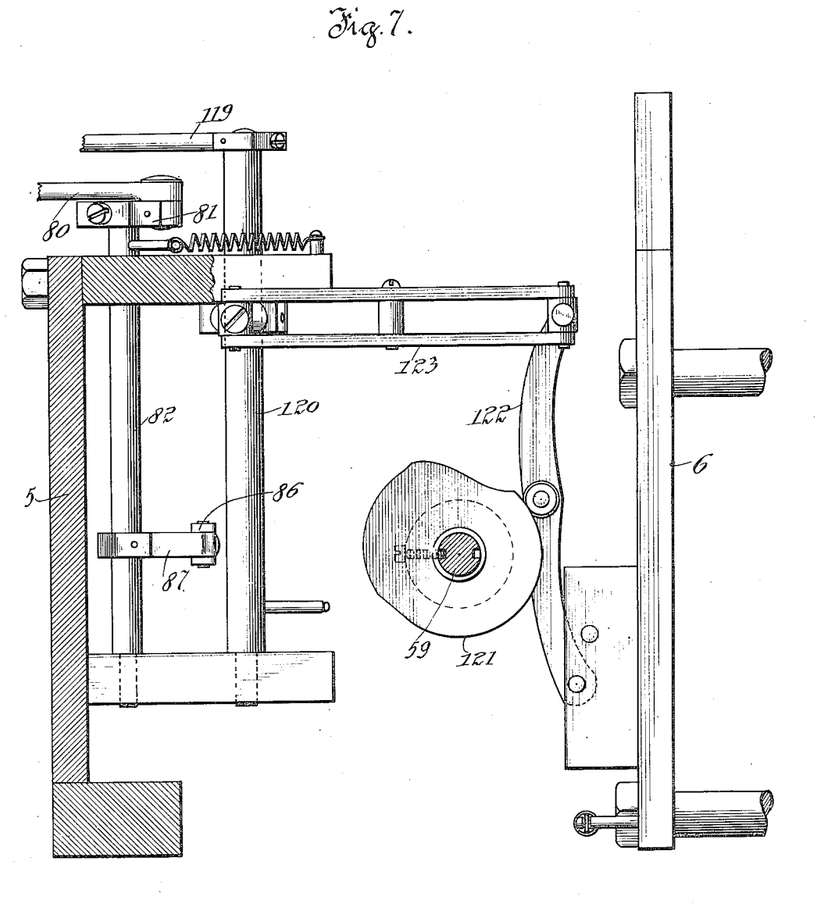
Fig. 7 is a section on the line 7—7 of Fig. 3.
Figure 8:
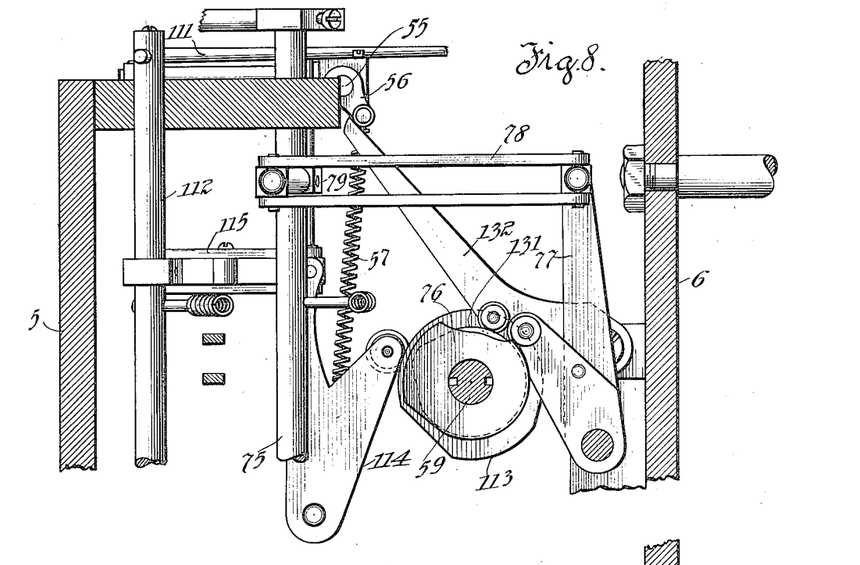
Fig. 8 is a section on the line 8—8 of Fig. 3.

Referring more particularly to Fig. 3, the machine is shown in position ready to begin the operation of forming a bow from the ribbon. The outer end of the ribbon 25 at this time is held by a clamping finger 26 which holds the end of the ribbon in a groove in the knife blade 27 and which is parallel to the cutting edge of the blade, (see also Fig. 12), said ribbon extending between two upstanding guides 28. As the ribbon-guide 16 is reciprocated from left to right in the manner heretofore described, the ribbon is extended lengthwise of the machine between a pair of upstanding guides 29 and above the end of a stationary finger 30 which extends forward from a downward projection of a support 31 secured to the frame-work of the machine (see Figs. 3 and 6).

Figures 15, 16:
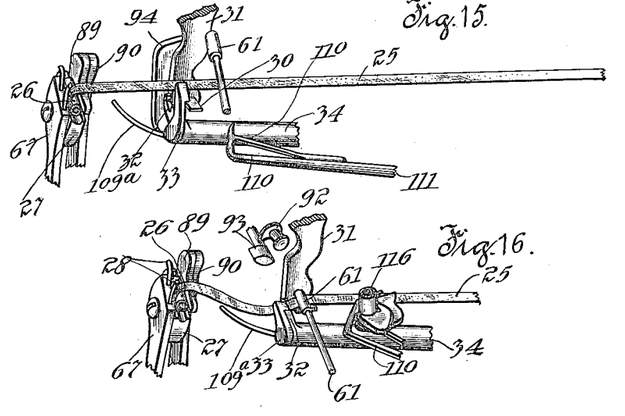
Figs. 15 to 21 inclusive are detail perspective views showing successive steps in the operation of the machine.

Just prior to the positioning of the ribbon in the manner just described, a pair of reciprocating gripping jaws 32, 33 open up to receive the ribbon between the same, said gripping jaws being at the same time slightly elevated (see Fig. 15). The mechanism for reciprocating these gripping jaws will now be described, reference being made more particularly to Figs. 3, 6, 8, 9 and 10. The jaw 32 projects from and may be integral with a sleeve 34, which at its opposite end is secured to a forwardly projecting stub-shaft 35, which is inclosed in a sleeve 36. The sleeve 36 is secured upon the upper end of an oscillating arm 37 which is secured at its lower end to a rock shaft 38. The rock shaft 38 is arranged to be actuated from a cam 39. The cam 39 is secured upon a shaft 40 which is adapted to be driven, through a system of gears 41, 42, 43, from the gear wheel 4 of the main driving shaft (see Fig. 1). Said cam 39 operates upon a lever 44 pivoted at 45 upon the frame work of the machine and having a roller 46, which bears upon a surface of the cam 39. The other end of the lever 44 is connected by a link 47 with a crank arm 48 of the shaft 38. Thus, as the lever 44 is raised and lowered by the surface of the cam 39, the shaft 38 is rocked to oscillate the arm 37 from left to right and thereby to reciprocate the sleeve 34 and the gripping jaws carried thereby. The function of the reciprocation of the gripping jaws 32, 33 will hereinafter be more fully described.

As the ribbon is drawn lengthwise of the machine in the manner just described, the jaws 32, 33 are moved forward to their extreme left position, but, as before stated, said jaws are at this time slightly elevated and opened as shown in Fig. 15. The lifting of the jaws is controlled by a cam 49 (see Fig. 6) mounted upon the shaft 40. The cam 49 operates through a roller 50 upon a lever 51, one end of which is loosely mounted upon the shaft 38 and the other end of which is normally held up by a spring 52. Pivoted upon the lever 51 is a link 53 which at its upper end is pivoted to a crank arm 54 carried by the shaft 35. In this manner the cam 49 acts to permit the spring 52 to draw up the arm 51 to a slight extent and thus slightly lift the jaws 32, 33.

Figure 9:
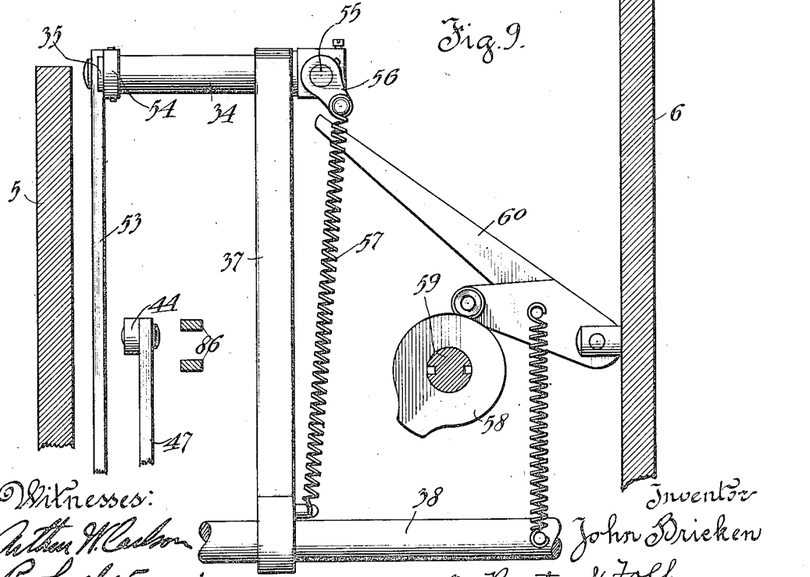
Fig. 9 is a detail section on the line 9—9 of Fig. 3.
Figure 10:
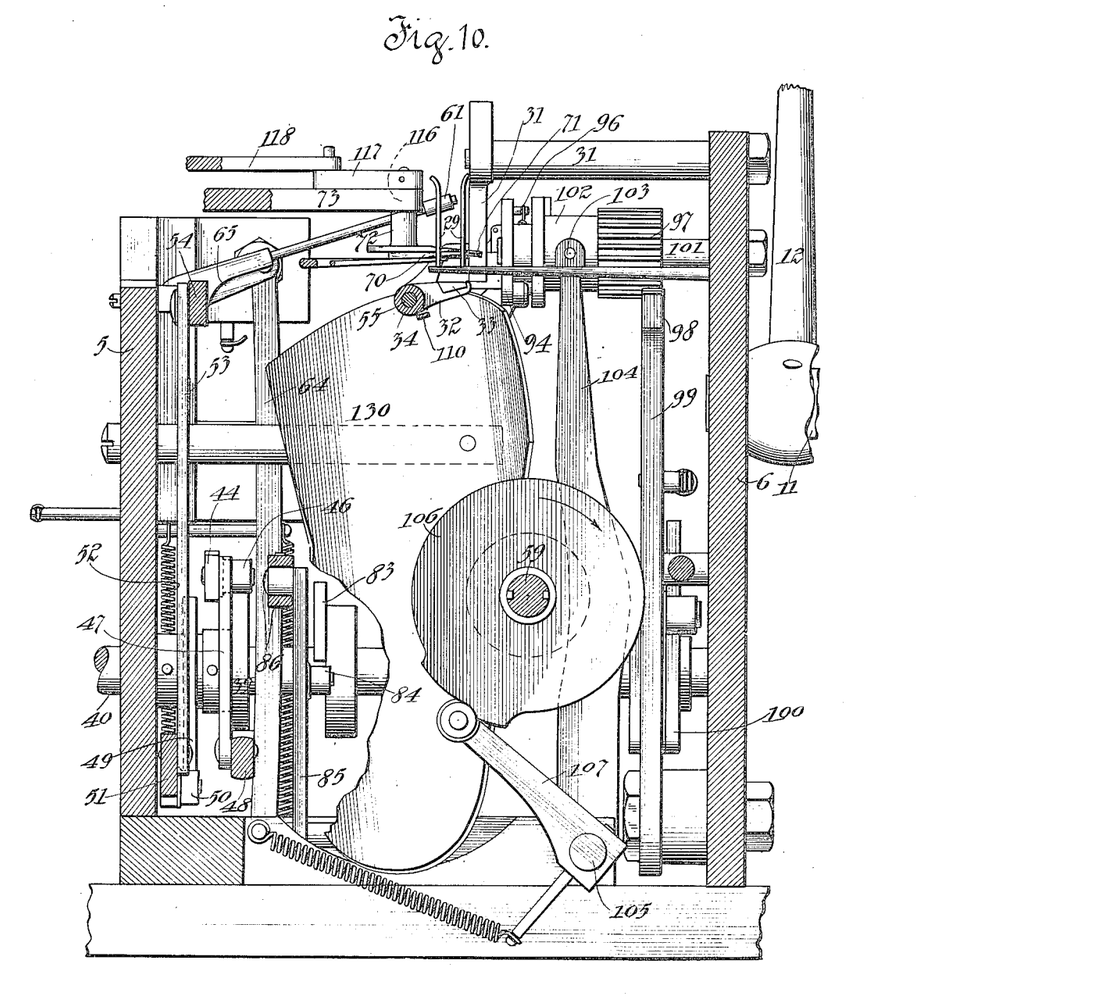
Fig. 10 is a section on the line 10—10 of Fig. 3.

The mechanism for opening and closing the jaws 32, 33 will now be described, reference being had more particularly to Figs. 3, 5, 6, 8, 9 and 10. The jaw 33 is secured upon the end of a pin 55, which is journaled in the sleeve 34. At its other end the pin 55 is provided with a crank-arm 56, which is normally held in a lowered position by a spring 57, thus normally holding the jaw 33 closed with respect to the jaw 32. At the end of the movement of the jaws to the left, a cam 58 mounted upon a longitudinally extending shaft 59 serves to operate the crank-arm 56 to open the jaw 33. Referring more particularly to Fig. 9, the cam 58 actuates a lever 60 pivoted at its lower end upon the frame of the machine, thereby lifting said lever so that the upper end thereof engages the crank-arm 56 and rocks the pin 55, thereby opening up the jaw 33. Immediately after the ribbon is thus located between the jaws 32 and 33, the cam 58 is moved to a position to permit the spring 57 to close the jaw 33.

At the same time that the gripping jaws 32, 33 are operating to receive and grip the ribbon, a movable pivoted finger 61 is being moved downward to clamp the ribbon against the finger 30 (see Fig. 16). Referring more particularly to Figs. 3, 5, 6, 10 and 11, it will be seen that the movable finger 61 is adapted to be actuated through the medium of a cam 62 mounted upon the shaft 59 (see particularly Fig. 11). The cam 62 acts upon a bell-crank lever 63, the opposite end of which is connected by a link 64 with a crank-arm 65 of a rock-shaft 66, upon which is secured the arm of the clamp 61. The cam mechanism is so timed that the finger 61 is lifted and thus moved out of the way as the ribbon is extended longitudinally of the machine. As the ribbon comes in position above the finger 30 the coöperating finger 61 is brought down to hold the ribbon.

Figure 17:
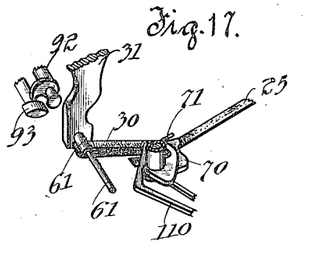

The next step in the operation of the machine is the release of the end of the ribbon from the clamping jaw 26, in order to permit said end to be folded back over the finger 30 (see Fig. 17) by the reciprocation of the gripping jaws 32, 33 to form one loop of the bow. This releasing of the end of the ribbon will now be described. Referring more particularly to Figs. 4, 6, 11, 12 and 13, it will be seen that the knife-blade 27, in the groove of which the ribbon is clamped by the clamping jaw 26, is carried upon a projection of a lever 67. Said lever is normally held in a lifted position by a spring 68, but is adapted to be depressed by a cam 69 secured upon the shaft 59. At the point of the operation of the machine just described, the cam 69 acts to depress the lower end of the lever 67 against the tension of the spring 68 and thus to slightly lower the knife blade 27, thereby releasing the end of the ribbon.

The operation of the gripping jaws 32, 33 to fold the ribbon back upon itself to form one of the loops of the bow will now be described. Although the jaws 32, 33 are grasping the ribbon, the jaws are merely closed under spring tension which permits the ribbon to slip through the jaws as said jaws are reciprocated to the right for the purpose of forming a loop about the finger 30. The gripping jaws are first moved downward a slight extent under the action of the cam 49, the operation of which has been heretofore fully described. The gripping jaws are then moved to the right under the action of the cam 39, the operation of which has also been fully described.

Figure 20:
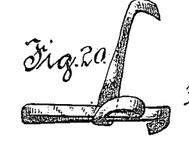
Figure 21:
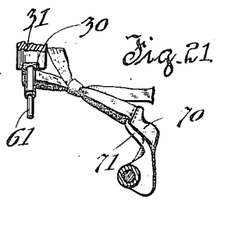
Figure 22:
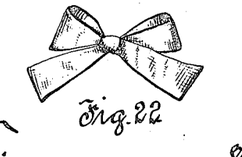
Fig. 22 is a perspective view of a bow formed by the machine.

At the same time that the gripping jaws 32, 33 are moved to the right to form one of the loops of the bow, the ribbon-guide 16 is oscillated to the left in the manner hereinbefore described, the ribbon being folded back upon itself (see Fig. 18) about the jaws 70 and 71 of the knot-forming mechanism. The structure and operation of the knot-forming mechanism will now be described, reference being had more particularly to Figs. 1, 3, 5, 6, 7, 8 and 11. At the time in the hereinbefore described operation of the machine when the gripping jaws 32, 33 are opened up to receive the ribbon, and the ribbon is extended lengthwise of the machine, the jaws 70 and 71 of the knot-forming mechanism are moved to the rear and directly above the extended ribbon. The jaw 71 is integral with a sleeve 72, which is secured upon the outer end of a lever arm 73. The lever arm 73 is pivoted intermediate of its ends upon a crank-arm 74 secured upon the end of a rock shaft 75. The rock shaft 75 acts to reciprocate the lever 73 from right to left, such movement of the rock shaft being controlled by a cam 76 secured upon the shaft 59. Said cam rocks the shaft 75 through a system of levers 77, 78, and 79. In addition to being moved to the left in the manner just described, the arm 73 is adapted to be swung to the rear so as to bring the knot-forming jaws above the extended ribbon. For this purpose, the end of the lever 73 is pivotally connected through a link 80 and a crank-arm 81 with a rock shaft 82. The rock shaft 82 is arranged to be actuated by a cam 83 carried by the cam shaft 40 (see Figs. 6 and 11). The cam 83, through the medium of a roller 84, acts upon a lever 85, to the upper end of which is connected a link 86, thereby reciprocating said link, which in turn, through a crank-arm 87, rocks the shaft 82. The jaws 70 and 71 of the knotting mechanism are thus moved into place above the extended ribbon (see Fig. 17). Therefore, when the ribbon-guide 16 moves to the left, as heretofore described, the ribbon is doubled back over the jaws 70, 71 to form a temporary loop (see Figs. 19 and 20) through which the other loop of the bow is to be subsequently drawn, said temporary loop being drawn into a knot after the last mentioned bow-loop is formed (see Fig. 21).

Figures 11, 12:
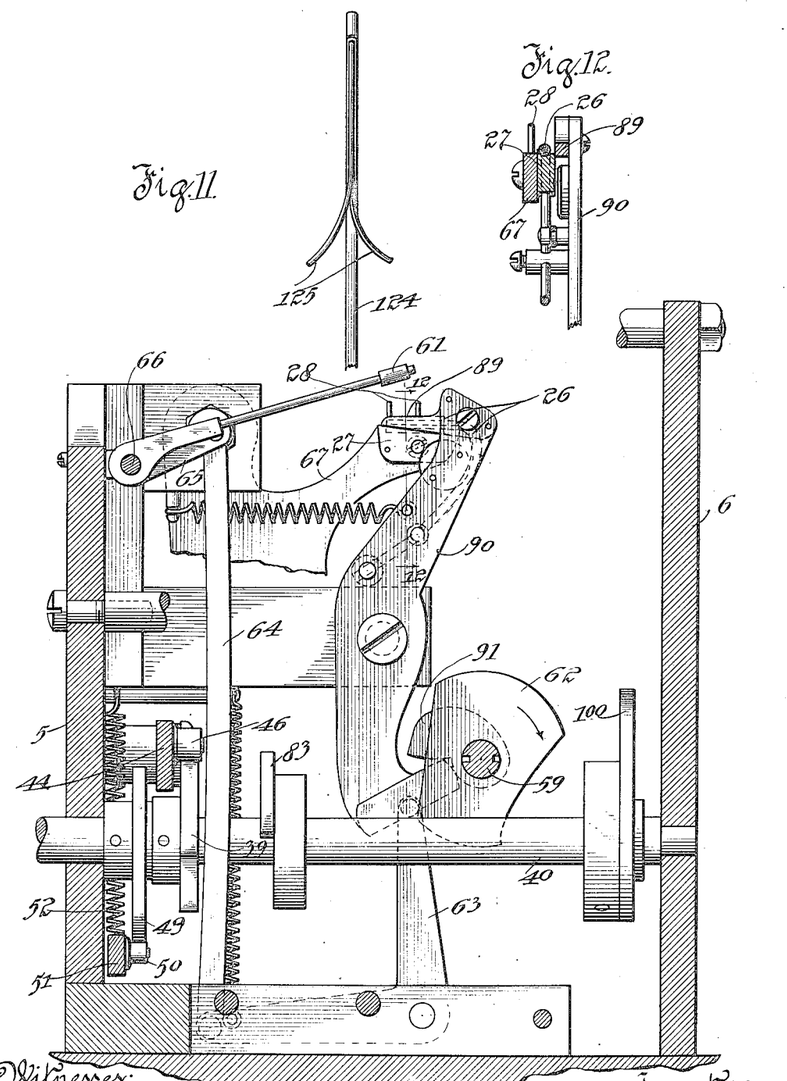
Fig. 11 is a section on the line 11—11 of Fig. 3.
Fig. 12 is a section on the line 12—12 of Fig. 11.
Figure 13:
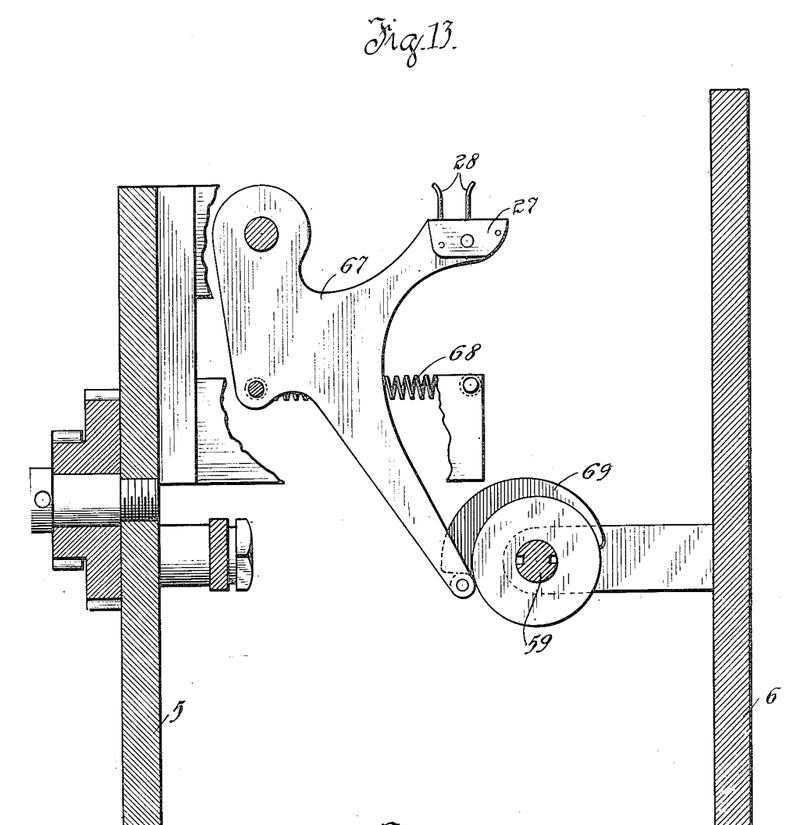
Fig. 13 is a detail section on the line 13—13 of Fig. 3.

As the ribbon is folded back over the temporary loop-forming jaws 70, 71, the ribbon-clamp 61 is actuated by its cam and is moved upward out of the path of the ribbon. The mechanism for operating this ribbon-clamp has been hereinbefore described. At the same time that the clamp 61 is moved out of the path of the ribbon, the clamping-finger 26 and one blade 89 of the cutting mechanism are moved to the rear to permit the ribbon to be brought into position to be cut by the knife. Referring to Figs. 11 and 12, the clamping-finger 26 is mounted upon the upper end of a lever 90, on which is also secured the blade 89, said finger extending parallel with said blade in position to enter the groove in the coöperating blade 27 when said blades are closed together. The lever 90 is pivoted intermediate of its ends upon the frame of the machine and is adapted to be actuated by a cam 91 secured upon the cam shaft 59. After the ribbon has been extended across the knife blade 27, the knife blade 89 is moved back into position to coöperate with the blade 27. Thereupon the knife blade 27 is lifted to a slight extent, as heretobefore described in connection with Fig. 13, thereby cutting off a length of ribbon required for the bow that is being formed and simultaneously clamping the end of the ribbon preparatory to the operation of forming the next succeeding bow (see Fig. 18).

Figure 14:
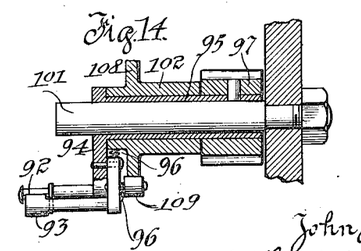
Fig. 14 is a detail, longitudinal section of the sleeve which supports the reciprocatory jaws.
Figure 18:
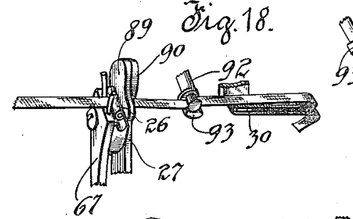

Prior to the severing of the ribbon and as the ribbon is brought down in position upon the knife blade 27, the ribbon is grasped at a point between the finger 30 and the blade 27 by a pair of oscillatory jaws 92, 93 (see particularly Figs. 14 and 18). The jaw 92 is in the form of a pin which extends forward from a head 94 secured to a sleeve 95. The jaw 93 is in the form of a pin parallel to the jaw 92. The jaw 93 is pivoted upon the head 94 and a spring 96 tends to hold the two jaws in closed position. The sleeve 95 has secured thereto a pinion 97 which meshes with a segmental rack 98. Said rack turns the pinion 97 to oscillate the jaws through almost a complete revolution. The segmental rack 98 is upon the upper end of a lever 99, which is pivoted at its lower end and which is acted upon by a cam 100 secured upon the shaft 40. The cam 100 serves to oscillate the segmental rack 98 from left to right and thus to turn the pinion first in one direction for almost a complete revolution and then in the opposite direction. After the ribbon has been drawn back over the jaws 70 and 71, the oscillatory jaws 92, 93, which at that time are separated from each other, are moved forward, one of the jaws being thus brought above and the other below the ribbon. In order that the jaws 92 and 93 may be thus moved forward, the sleeve 95 is slidably mounted upon a supporting pivot 101. A sleeve 102 surrounds the sleeve 95 and has projecting therefrom a pin 103 to which is pivoted the upper end of an operating lever 104. The lever 104 is secured at its lower end upon a short-rock shaft 105 which extends longitudinally of the machine. The rock-shaft 105 is adapted to be actuated by a cam 106 secured upon the cam shaft 59 (see Figs. 5 and 10). The cam 106 controls the actuation of a crank-arm 107 secured upon the rock-shaft 105. Therefore as the ribbon is brought in place to be severed by the cutting mechanism the jaws 92 and 93 are moved forward upon opposite sides of the ribbon. Said jaws are then closed through the action of a cam 108 secured upon the sleeve 102 (see Fig. 18). As the sleeve 95 and the crank-arm 94 thereof are turned by the pinion 97, a roller 109 carried by the pivoted jaw 93 engages with the cam 108. Said cam thus controls the opening and closing of the jaw 93, and at the proper time the cam permits the spring 96 to close the jaw 93 upon the jaw 92 and thus to hold the end of the length of ribbon from which the bow is formed.

Figure 19:
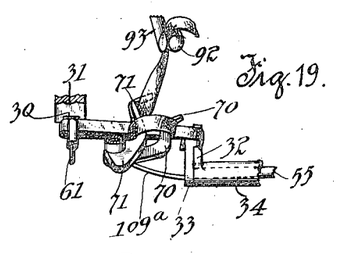

In the next succeeding step in the operation of the machine, the oscillatory jaws 92, 93 are moved forward and then downward and rearward thus carrying the severed end of the length about the bow-loop already formed (see Fig. 19). The ribbon as it is brought around said bow-loop is guided by a curved finger 109$^a$ which projects beyond the end of the sleeve 34. Said finger 109$^a$ is mounted to reciprocate with the jaws 32, 33 and is therefore moved to its operative position when said jaws are at the end of their stroke to the right. The downward and rearward movement of the oscillatory jaws are controlled by the cams 100 and 106, respectively, in the manner already described. When said jaws have carried the end of the severed material below the finger 30, the clamp 61 is operated by its cam to hold in place the bow-loop previously formed about the finger 30. Near the completion of the oscillation of the jaws 92, 93, the length of ribbon is carried thereby between the jaws 70, 71, (see Fig. 19) which latter jaws have moved to the left to locate the position of the temporary loop and have opened up to adjust the length of such temporary loop. When the oscillating jaws 92 and 93 have moved up to their highest position the jaw 70 is closed upon the jaw 71.

Just previous to the closing of the jaws 70 and 71 upon the severed length, a knot-locating guide 110 (see Figs. 3, 15, 16 and 17) is swung forward into the temporary loop. Said knot-locating guide has an angular base portion, one of the sides of the angle being extended to provide a pointed end. The knot-locating guide 110 is carried upon the end of an arm 111 (see Figs. 1, 3, 6 and 15). The arm 111 is secured to a vertical rock-shaft 112, which is adapted to be actuated by a cam 113 secured upon the cam shaft 59. The cam 113 actuates a lever 114, which through a link 115 serves to rock the shaft 112, and thus actuate the guide 110.

When the knot-locating guide has thus been swung into the temporary loop the jaw 70 closes upon the jaw 71 and the end of the piece of ribbon is grasped between said jaws. The means for closing the jaw 70 upon the jaw 71 hereinbefore mentioned will now be described. The jaw 70 is secured upon the lower end of a pin 116, which extends through the sleeve 72 (see Figs. 3, 6 and 10). The upper end of the pin 116 has secured thereto a crank 117, which is connected by a link 118 to a crank 119 secured at the upper end of a vertical rock-shaft 120. The rock-shaft 120 is arranged to be actuated by a cam 121, secured upon the cam shaft 59 (see Fig. 7). The cam 121 rocks the shaft 120 through the medium of a lever 122 and a link 123. After the jaw 70 is closed on the jaw 71, said jaws are drawn forward and to the right and the oscillating jaws 92, 93 are slightly opened up to release the end of the strip. This latter movement of the jaws 70 and 71 is controlled by the rock-shafts 82 and 120, such shafts being operated by their cams in the manner hereinbefore described. The ribbon is thus drawn through the temporary loop and doubled back upon itself to form one of the loops of the bow (see Figs. 19 and 21). Meanwhile one end of the length of ribbon is being held between the jaws 32 and 33. The knot-locating guide, which has served to hold the temporary loop open while the loop of the bow is drawn therethrough, is during this operation gradually withdrawn from the temporary loop, which is thereupon permitted to be drawn into a knot by the pulling action of the jaws 70, 71. The guide 110 as it is withdrawn also serves to properly locate the position of the knot.

When the knot has thus been tied and the bow therefore completed, the jaws 32, 33 are slightly opened up to release the end of the bow that has been held thereby while the knot was being tied. This opening of said jaws is accomplished by the action of a cam 131 upon a lever 132 (see Fig. 8). The lever 132 actuates the crank 56 to open up the jaws in substantially the same manner as the jaws are opened up by the operation of the lever 60 hereinbefore described in connection with Fig. 9.

After the jaws 32, 33 have thus opened up to release the end of the bow, the cams 121 and 76 permit the jaws 70, 71 to open and thereby release the loop of the bow from said jaws. At the same time the clamp 61 is operated by its cam to release the other loop of the bow from the finger 30. Thereupon a kicker arm 124 is moved downward to eject the formed bow from the machine. The kicker or ejecting mechanism consists of a kicker arm 124, having on its free end two downwardly extending prongs 125 (see Figs. 3 and 4). The kicker arm is normally in an elevated position but is adapted to be lowered through the medium of a crank arm 126 secured to a rock shaft 127. Said rock shaft extends transversely of the machine and at its forward end is provided with a crank arm 128 which is spring pressed against the surface of a cam 129 secured to the gear wheel 4 (see Fig. 1). Thus, at the proper time in the operation of the machine, said kicker arm is depressed and the bow is pushed by the prongs 125 into a chute 130 which guides the completed bow from the machine.

The gripping jaws 32, 33 upon the completion of the operation thus far described are moved to the left preparatory to forming another bow, such movement being under the control of the cam 39, as hereinbefore described.

During the foregoing described operation of forming one bow from the severed length of ribbon, the oscillating ribbon guide 16, after the ribbon has been severed, moves to the right, in the manner hereinbefore described, for the purpose of extending the ribbon for the next succeeding bow. At the same time the oscillatory jaws 92, 93 are returned to their initial position and opened preparatory to grasping the ribbon when it has been extended above the finger 30. The operations of forming two successive bows, thus, to a certain extent, overlap each other.

The various cam shafts hereinbefore described are all operated from the main driving shaft 1. Referring to Fig. 5, the cam shaft 59 is driven from the shaft 1 through the medium of gears 133, 134 and 135. In the present machine the various levers operated upon by their respective cams are spring pressed against the surfaces of the cams. It will of course be understood that other ordinary cam structure may be substituted therefor.

It is not my intention to limit my invention to the details of construction shown in the accompanying drawings, as it is apparent that such details may be widely varied without departing from the spirit and scope of the invention as set forth in the accompanying claims.

What I claim is:

1. In a machine for forming ribbon into bows, the combination of means for folding the ribbon upon itself to form one loop of a bow, means for folding the ribbon back upon itself parallel to said formed loop to provide a temporary loop, means for cutting a suitable length from said ribbon for said bow, means for carrying the remaining portion of said length about said first mentioned loop of the bow, and means for drawing said remaining portion through said temporary loop and then pulling the latter into a knot.

2. In a machine for forming ribbon into bows, the combination of means for folding the ribbon upon itself to form one loop of a bow, means for folding the ribbon back upon itself parallel to said formed loop to provide a temporary loop, means for cutting a suitable length from said ribbon for said bow, means for carrying the remaining portion of said length about said first mentioned loop of the bow, and means for grasping said remaining portion, drawing it, folded back upon itself to form the other loop of the bow, through the temporary loop and tightening the latter into a knot.

3. In a machine for forming ribbon into bows, the combination of means for holding the end of the ribbon, means for extending the ribbon, means for holding the ribbon at a point which will provide a bow-loop of suitable length, said holding means then releasing said end of the ribbon, means for then folding the released end upon itself to form said bow-loop, means for folding the other portion of the ribbon back upon said bow-loop to form a temporary loop, means for cutting a suitable length from said ribbon for said bow, means for carrying the remaining portion of said length about said bow-loop, and means for grasping said remaining portion and drawing it, folded upon itself to form the other bow-loop, through the temporary loop, thereby tightening the latter into a knot.

4. In a machine for forming ribbon into bows, means for rotatably supporting a spool of ribbon, means for cutting the ribbon into lengths suitable for bows, means for partially tying a bow-knot by folding said ribbon into flat sections before the length from which the bow is formed is cut, and means for holding the cut end of the supply ribbon during the completion of the bow tying operation.

5. In a machine for forming ribbon into bows, means for rotatably supporting a spool of ribbon, means for cutting the ribbon into lengths suitable for bows, means for partially tying a bow-knot by folding said ribbon into flat sections before the length from which the bow is formed is cut, means for holding the cut end of the supply ribbon during the completion of the knot tying operation, and means for taking up the slack between said spool and the end of said ribbon.

6. In a machine for forming ribbons into bows, means for initially holding the end of the ribbon, means for temporarily gripping the ribbon at a distance from said end and about which said ribbon may be folded to form one of the bow-loops, said end being released during said folding operation, means for forming a temporary middle loop, and means for concomitantly cutting the ribbon to a proper length for a bow.

7. In a machine for forming ribbon into bows, the combination of a stationary finger and an oscillating ribbon guide for extending the ribbon back and forth transversely of said finger.

8. In a machine for forming ribbon into bows, the combination of means for initially holding the end of the ribbon, a stationary finger, and an oscillating ribbon guide moving back and forth transversely of said finger to extend the ribbon at one side of said finger.

9. In a machine for forming ribbon into bows, the combination of means for initially holding the end of the ribbon, an oscillating ribbon-guide, and means for temporarily gripping the ribbon, when extended by said guide at a distance from said end.

10. In a machine for forming ribbon into bows, a ribbon guide comprising a rectangular frame having a guide roller at one end over which the ribbon is passed and a pair of parallel rollers at the other end between which the ribbon is threaded, and means for oscillating said guide.

11. In a machine for forming ribbon into bows, the combination of a vertically disposed reciprocating ribbon-guide having a horizontal guide roller at its upper end over which the ribbon is led and an opening at its lower end through which the ribbon is guided from said roller, and means for maintaining said ribbon-guide in vertical position throughout the extent of its oscillations.

12. In a machine for forming ribbon into bows, the combination of a stationary finger on one side of which a ribbon is adapted to be transversely extended, and a coöperating finger movable toward and from said stationary finger, said fingers coöperating to hold the ribbon while the loops of the bows are being formed.

13. In a machine for forming ribbon into bows, the combination of a stationary finger over which a ribbon is adapted to be extended, a movable finger coöperating therewith to hold the ribbon while the bow-loops are formed, and cam-controlled mechanism for moving said movable finger into clamping relation with the stationary finger while the ribbon is being doubled upon itself to form the first bow-loop, then withdrawing said movable finger to permit the ribbon to be doubled back upon itself to form a temporary loop, and thereafter moving the movable finger into clamping relation with the stationary finger during the succeeding operation of the machine in forming the bow.

14. In a machine for forming ribbon into bows, the combination of means for initially holding the end of the ribbon, a finger for holding the ribbon at a distance from said end, and reciprocating jaws for yieldingly grasping the ribbon at one side of said finger and doubling the ribbon upon itself about said finger to form one of the loops of the bow.

15. In a machine for forming ribbon into bows, the combination of means for initially holding the end of the ribbon, means for extending the ribbon, a finger over which said ribbon is extended, and reciprocating jaws for doubling the end of the ribbon about said finger to form one of the loops of the bow.

16. In a machine for forming ribbon into bows, the combination of a finger transversely of which a ribbon is adapted to be extended, a pair of jaws arranged to reciprocate lengthwise of the extended ribbon, and cam-controlled mechanism for operating said jaws, said cam-controlled mechanism actuating said jaws, at one end of their stroke, to open up and then yieldingly close upon said ribbon and thereupon to move to the other end of its reciprocating stroke and there remain with the jaws closed until the bow is formed.

17. In a machine of the character described, the combination of means for initially holding the end of a ribbon, a stationary finger, means for extending the ribbon transversely of said finger, a pair of jaws arranged to reciprocate longitudinally of said extended ribbon, and cam-controlled mechanism for successively actuating said jaws, at one end of their stroke, to open up, to be slightly elevated, to yieldingly close upon said ribbon, to be slightly lowered and to move to the other limit of their reciprocating stroke.

18. In a machine of the character described, reciprocating loop-forming mechanism comprising a longitudinally reciprocating sleeve having a jaw extending laterally from one end thereof, a pin extending through said sleeve, a jaw carried by one end of said pin and coöperating with said other jaw, a crank-arm secured to the other end of said pin, means actuated at each end of the stroke of said reciprocating sleeve to actuate said crank to control the opening and closing of said jaws.

19. In a machine of the character described, reciprocating loop-forming mechanism comprising an oscillating lever, a stub-shaft pivoted in the free end of said lever, a sleeve secured to one end of said shaft, a jaw extending laterally from said sleeve, a pin extending through said sleeve, a jaw carried by one end of said pin and coöperating with said other jaw, a crank-arm secured to the other end of said pin, means actuated at each end of the stroke of said oscillating lever to actuate said crank-arm to control the opening and closing of said jaws, and means actuated at one end of the stroke of said oscillating lever to rock said stub-shaft and thereby to first elevate and then lower said jaws.

20. In a machine for forming ribbon into bows, the combination of a pair of coöperating jaws, and cam-controlled mechanism for moving said jaws into position at one side of an extended ribbon, subsequently closing said jaws upon the portion of the ribbon presented thereto, then withdrawing said jaws to their initial position, and thereafter opening said jaws.

21. In a machine for forming ribbon into bows, the combination of a pair of coöperating jaws, means for doubling a ribbon upon itself about said jaws to form a temporary loop, means for presenting the ribbon to said jaws, and means for actuating said jaws to grasp said ribbon, draw the same through said temporary loop and tighten the latter into a knot.

22. In a machine for forming ribbon into bows, the combination of a pair of coöperating jaws, means for doubling a ribbon upon itself about said jaws to form a temporary loop, means for presenting the ribbon to said jaws, means for actuating said jaws to grasp said ribbon, draw the same through said temporary loop and tighten the latter into a knot, and a knot-guide for temporarily holding said loop open and locating the position of said knot.

23. In a machine of the character described, the combination of a lever, a sleeve secured to one end of said lever, a jaw extending from said sleeve, a pin pivoted in said sleeve, a jaw secured upon one end of said pin in coöperating relation with said first named jaw, a crank-arm, secured to the other end of said pin, means for operating said crank-arm to open and close said jaws, a crank-arm upon which said lever is pivoted intermediate the ends of the lever, means for operating said last-mentioned crank-arm to move said jaws toward and away from an extended ribbon, and means for also imparting a longitudinal movement to said lever.

24. In a machine for forming ribbon into bows, the combination of a vertically movable, horizontal knife blade, and a coöperating blade reciprocating longitudinally of said other blade to permit of the positioning of the ribbon between said blades.

25. In a machine for forming ribbon into bows, the combination of a vertically movable, horizontal knife blade, and a coöperating blade reciprocating longitudinally of said other blade, and means mounted in fixed relation with one of said blades for holding the severed end of a supply ribbon severed by said blades.

26. In a machine for forming ribbon into bows, the combination of two coöperating knife-blades one of which is provided with a groove adjacent its cutting edge and the other with a clamping finger adapted to enter said groove when the blades are closed together.

27. In a machine for forming ribbon into bows, the combination of a knife-blade having a groove parallel to its cutting edge, a coöperating knife-blade, and a clamping finger mounted parallel to and in fixed relation with said last-mentioned knife-blade in position to enter said groove when said blades are closed together.

28. In a machine for forming ribbon into bows, the combination of a vertically movable, horizontal knife-blade having a groove parallel to its cutting edge, a coöperating knife-blade reciprocating longitudinally of said first-mentioned blade, and a clamping finger mounted parallel to and in fixed relation with said second-mentioned blade in position to enter said groove when said blades are closed together.

29. In a machine for forming ribbon into bows, the combination of a knot-guide and cam-controlled mechanism for moving said guide into the temporary loop of a bow to hold said loop open as the ribbon is drawn therethrough in forming a bow-loop and for gradually withdrawing said guide to permit of said temporary loop being tightened into a knot.

30. In a machine for forming ribbon into bows, a knot-guide comprising an angular member having one of its sides extended from the vertex of the angle and means for projecting said extension into a temporary loop in said ribbon to hold it open.

31. In a machine for forming ribbon into bows, an oscillating knot-guide having a pointed end and an enlarged base portion, said base portion being adapted to hold open the temporary loop of the bow while one of the bow-loops is drawn therethrough and said pointed end being adapted to finally position the knot of said bow as said loop is tightened.

32. In a machine for forming ribbon into bows, the combination of a stationary finger, a pair of coöperating oscillatory jaws, and cam-controlled mechanism for moving said jaws forward upon opposite sides of an extended ribbon and then closing the same upon said ribbon and thereafter revolving said jaws a partial revolution and simultaneously imparting a rearward motion thereto to fold said ribbon over said finger.

33. In a machine of the character described, the combination of a pivot, a sleeve journaled thereon, gripping jaws carried by said sleeve, means for oscillating said sleeve, and means for reciprocating said sleeve concomitantly with the oscillation thereof.

34. In a machine of the character described, the combination of a pivot, a sleeve journaled thereon, a head secured to one end of said sleeve, a jaw secured to said head and extending parallel to said pivot, a spring-pressed jaw pivoted to said head and coöperating with said other jaw, a non-rotatable cam surrounding said sleeve adjacent to said jaws, a projection extending from said pivoted jaw and engaging said cam, means for oscillating said sleeve, and means for reciprocating said sleeve concomitantly with the oscillation thereof.

35. In a machine for forming ribbon into bows, means for doubling the end of a ribbon upon itself to form one of the bow-loops, means for doubling the ribbon back upon itself to form a temporary loop, means for severing the ribbon to provide a length suitable for said bow, and oscillatory jaws for carrying the severed end of said length about said bow-loop into position to be drawn through said temporary loop.

36. In a machine for forming ribbon into bows, means for doubling the end of a ribbon upon itself to form one of the bow-loops, means for doubling the ribbon back upon itself to form a temporary loop, means for severing the ribbon to provide a length suitable for said bow, a pair of coöperating oscillatory jaws, and cam-controlled mechanism for moving said jaws forward upon opposite sides of the severed end of said length, closing the jaws thereupon and thereafter revolving said jaws a partial revolution and simultaneously imparting a rearward motion thereto.

In witness whereof, I hereunto subscribe my name this 10th day of September, A. D. 1914.

JOHN BRICKEN.

Witnesses:
 ALFRED H. MOORE,
 GEORGE E. FOLK.